United States Patent [19]

Blair

[11] 4,004,668
[45] Jan. 25, 1977

[54] FAN DRIVE SECANT PUMPING GROOVES
[75] Inventor: Everett George Blair, Plainfield, Ind.
[73] Assignee: Wallace-Murray Corporation, New York, N.Y.
[22] Filed: Aug. 25, 1975
[21] Appl. No.: 607,508
[52] U.S. Cl. .......................... 192/58 B; 192/113 B
[51] Int. Cl.² .................................. F16D 35/00
[58] Field of Search ..................... 192/58 B, 113 B
[56] References Cited

UNITED STATES PATENTS

| 3,419,122 | 12/1968 | Connelly | 192/58 B |
| 3,512,622 | 5/1970 | Sutaruk | 192/58 B |
| 3,584,716 | 6/1971 | Coty | 192/58 B |

*Primary Examiner*—Allan D. Herrmann
*Attorney, Agent, or Firm*—Thomas J. Greer, Jr.

[57] ABSTRACT

A fluid coupling of the type adapted for a fan for an automotive cooling system. A driving disc turns within a housing to which the fan is coupled. One face of the disc carries concentric ridges or lands which are positioned to project into complementary concentric channels carried by the housing, with a shear fluid such as a silicone fluid at least partially filling the concentric channels. Secant grooves extend across the top of the interdigitated ridges of the drive disc and of the housing interior to cause the silicone shear fluid to move generally radially. Such fluid circulation increases the useful life of the shear fluid by inhibiting high temperature build-up thereof.

7 Claims, 7 Drawing Figures

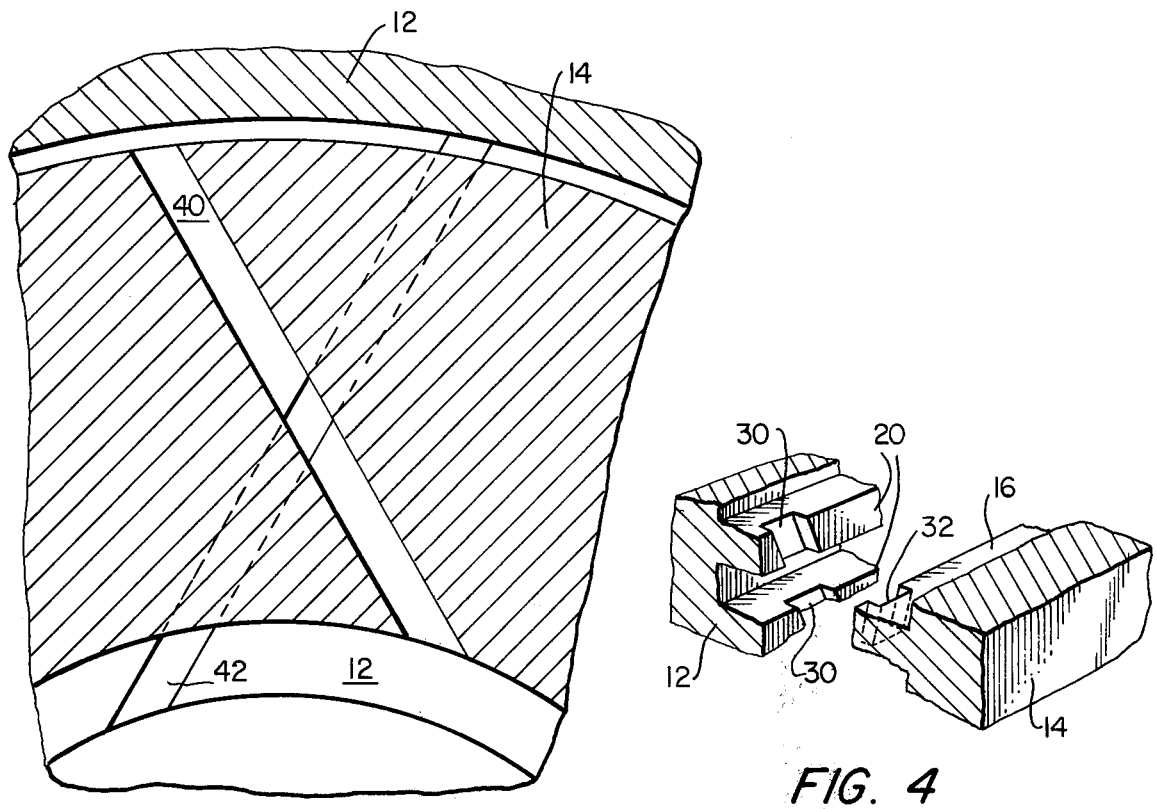
FIG. 3
FIG. 4
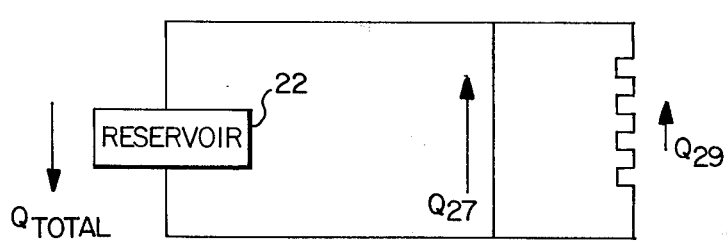
FIG. 5
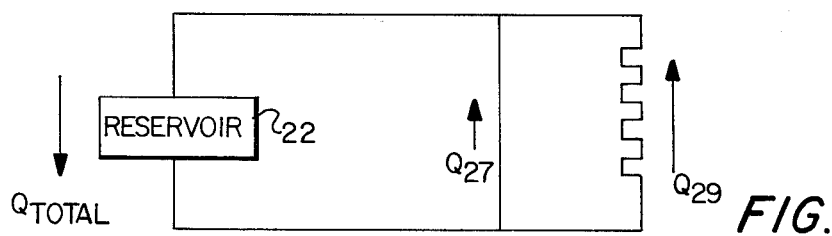
FIG. 6

FAN DRIVE SECANT PUMPING GROOVES

This invention relates to fluid couplings of the type particularly adapted for use with automotive cooling systems. In the cooling system of an internal combustion engine, a fan is generally provided for moving air through the radiator to thereby cool the water which passes through the engine. In recent years, the concept of variably coupled fans has engaged the attention of those in the internal combustion art. Such fans are driven by a hydraulic coupling which contains a shear fluid such as a silicone liquid. By a variety of arrangements, the degree of shear coupling is made to depend upon the temperature of the engine. In this manner, a very hot engine will receive a maximum of air through its radiator while a relatively cool engine will not require as much air to be moved to it by the fan. This, in turn, cuts down on the power requirements of the engine during those times when the temperature of the engine is relatively low. This is accomplished, in many prior art constructions, by the use of a valve to control the amount of the silicone liquid which is available for transferring rotary engine (representing an expenditure of hosrepower) from the engine to the fan.

Typical types of such fluid coupling constructions for motor fan drives are shown by U.S. Pat. Nos. 3,272,188 to Sabat; 3,323,623 to Roper; 3,419,122 to Connally; and 3,809,197 to Clancy. These patents disclose a drive disc which is provided with a plurality of concentric land portions on one face which mate with corresponding channels on one portion of the driven housing to which the fan is attached. The space between the interdigitated land and channel portions is adapted to be filled with varying quantities of the silicone shear liquid, the quantity being governed by the engine temperature. The circulation of the shear fluid with many existing disc and housing designs is generally controlled only by centrifugal force on the fluid on both sides of the drive rotor. There is a tendency for the fluid to flow radially outwardly and remain at the radially outermost portion of the housing. This is due to the fact that the forces on the fluid on both sides of the drive disc are the same.

According to the practice of this invention, such a design is enhanced by the use of pumping grooves whose function is to cause a greater circulation of the shear liquid in the working area, i.e., the space between the land portions and the corresponding chamnels. While the use of pumping grooves, in general, is not itself novel in this art, as may be seen by reference to U.S. Pat. Nos. 3,002,595 and 3,007,560 to Weir, and 2,706,547 and 2,710,680 to Ranzi, the use of the particular pumping grooves which are to be described in novel in the type of fan drive employing interdigitated land and channel elements. By increasing the circulation of the shear fluid its useful life is lengthened. This follows from the fact that increased circulation inhibits high temperature build-up of the fluid at those disc-housing interface portions at which the shear liquid would otherwise tend to settle.

IN THE DRAWINGS

FIG. 3 is a view taken along section 3—3 of FIG. 1;

FIG. 4 is a partial exploded perspective view of adjacent land portions of the disc and housing, respectively, and illustrate a pumping groove in each.

FIGS. 5 and 6 are schematic views of hydraulic circuits.

Figure 1:
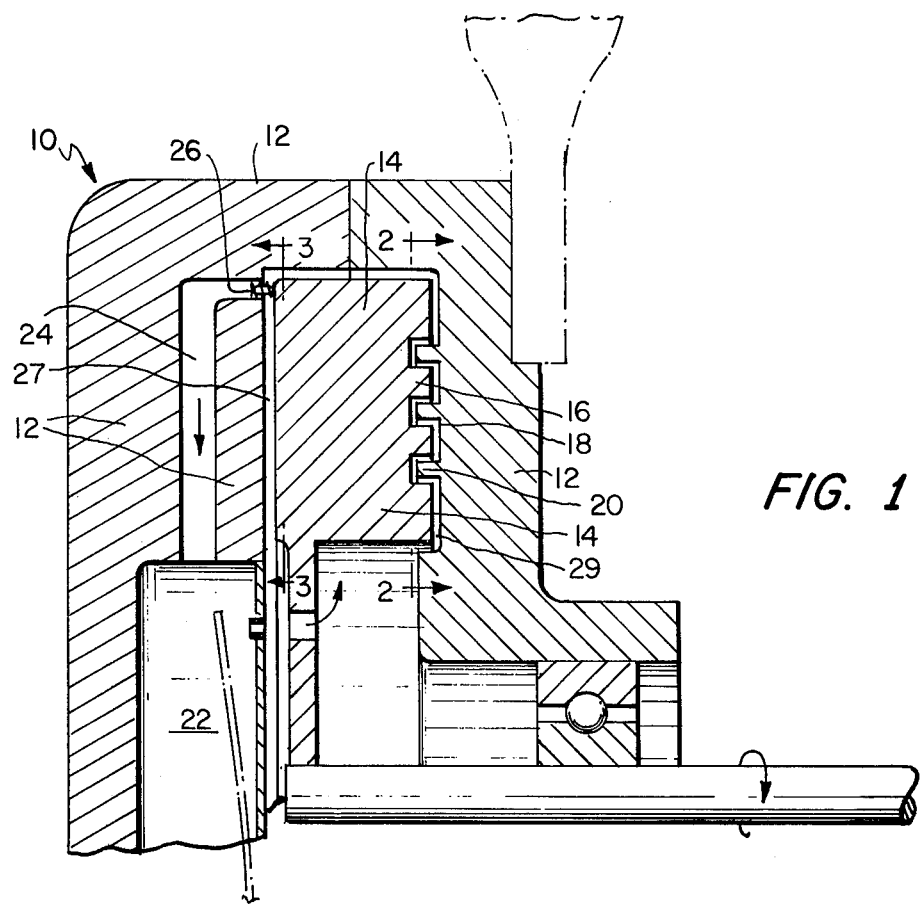
FIG. 1 is a partial cross-sectional view of a drive disc and associated housing.

Referring now to the drawings, the numeral 10 denotes generally a housing which includes walls 12 and in which is positioned a relatively rotatable drive disc 14. The housing 10 carries a radiator cooling fan, indicated in dashed lines, and a drive disc 14 suitably coupled to a drive shaft from an internal combustion engine, as schematically indicated. Alternatively, the housing may be coupled to the drive shaft from the internal combustion engine, while the disc 14 is coupled to the fan. It is only necessary to recognize that the disc 14 and housing 10 are relatively rotatable. The section shown in FIG. 1 is a partial section of the upper half of the assembly.

The numeral 16 denotes any one of a plurality of radially spaced, integral land or ridge portions carried by the radially outermost regions of one face of disc 14. The numeral 18 denotes any one of a plurality of complementary channels or recesses in one wall portion. The regions between the channels 18 of housing 12 define upstanding land or ridge portions 20. As indicated at FIG. 1, there is appreciable clearance between land portions 16 and concentric channels 18. A shear substance such as a silicone liquid is placed in reservoir 22 for passage through the indicated (temperature controlled) flapper value and thence radially out both faces of the drive disc 14. The transmission of torque through the shear fluid occurs primarily at the interdigitated (right) face of the disc. Various modes of controlling this operation are fully known to workers in this art, and are exemplified, for example, by the above-noted U.S. patents to Roper, Clancy, Connally, and Sabat. The shear fluid returns to the reservoir through passage 24, the fluid forced therein by dam 26 of conventional constriction. Disc face flow passages are indicated by numerals 27 and 29.

Figure 2:
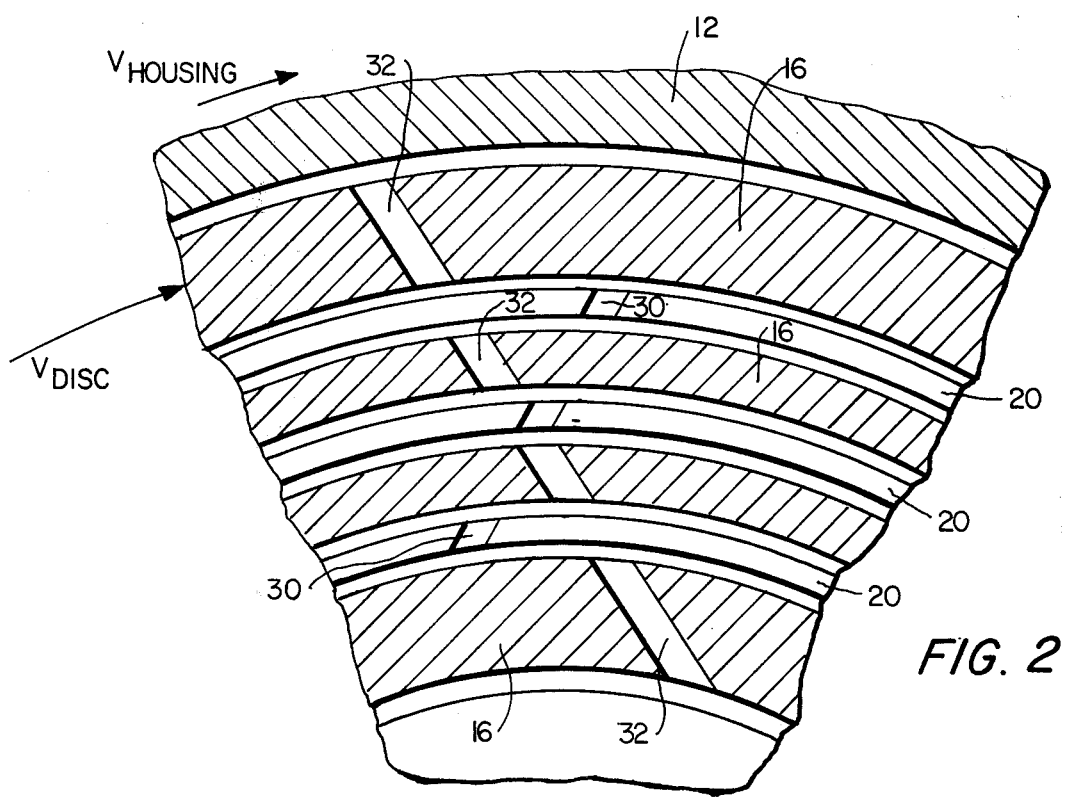
FIG. 2 is a view taken along section 2—2 of FIG. 1.
Figure 7:
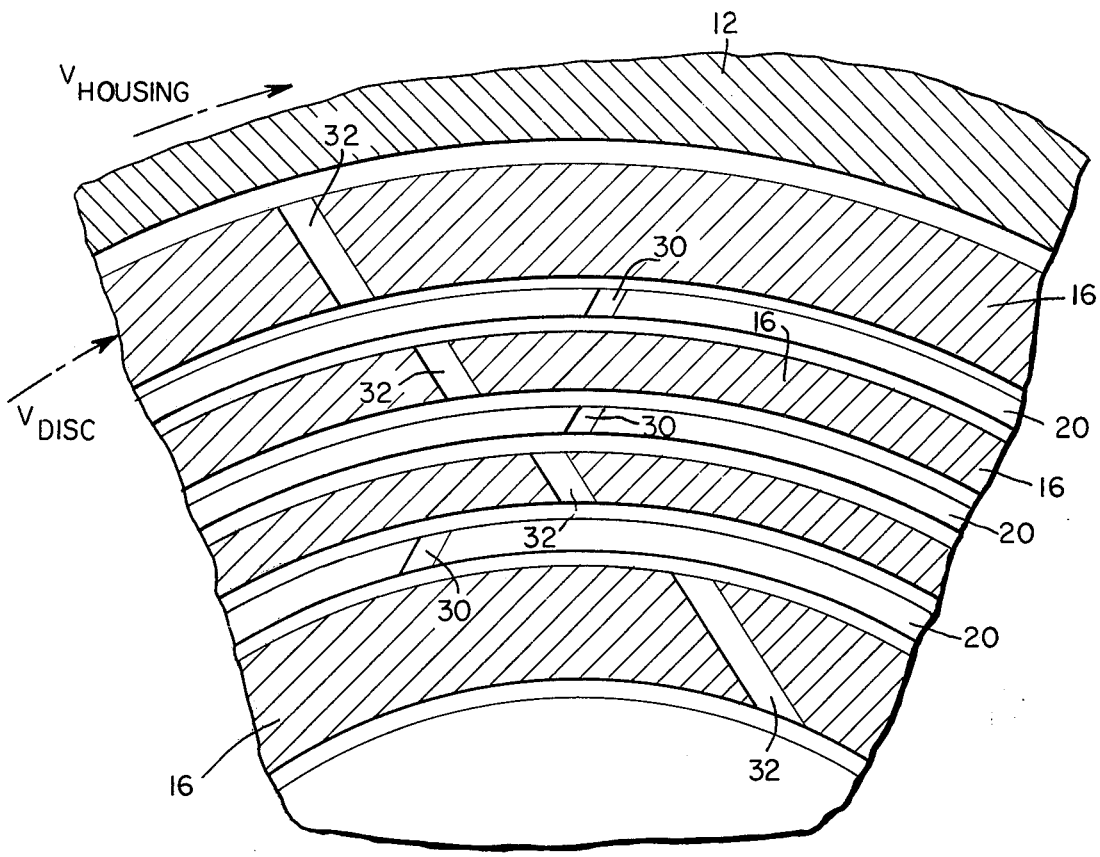
FIG. 7 is a view similar to FIG. 2 but showing the individual grooves in the individual lands of both the disc and the housing non-aligned.

Referring now to FIGs. 2 and 3 of the drawings, the numeral 30 denotes a secanted groove across the axially directed, vertical surface of ridges 20, the groove extending generally radially from the radially outermost land portion and through the remaining land portions. The radially innermost extent of the secanted groove 30 is defined by the radially innermost ridge or land 20.

A second secanted groove, denoted by the numeral 32, extends vertically across the ridges 16. It will be observed from FIG. 2 that the projections of the grooves 30 and 32 intersect one another in one relative position because they are slanted, i.e., secanted, in opposite directions.

The depth of groove 30 in ridges 20 and the depth of groove 32 in ridges 16 may vary over wide limits. Thus, it may be relatively shallow, or, may occupy the entire axial extent of the respective ridge.

Referring now to FIG. 3 of the drawings, it will be seen that the left face of drive disc 14 is provided with a groove 40 shown in the solid lines at FIG. 3, again a slanted or secanted groove. The right face of the left end portion of housing 12 (see FIG. 1) may also be provided with a corresponding secanted groove 42.

The construction of FIG. 3 is known and is given for completeness in describing the invention.

The pumping operation of the secant grooves is as follows. The grooves 30, 32, 40, 42 are termed pumping grooves bacause relative rotation between the housing 12 and disc 14 causes movement of the shear liquid in a generally radial direction at both the left and right disc faces. It will be recalled that both the drive disc and housing rotate in the same direction, but at different rates. The driven element will not rotate as rapidly as the driving element. The relative speeds of rotation are indicated by the curved arrows at FIG. 2. The grooves 30 and 32 assist the flow of the shear liquid radially outwardly. Grooves 40 and 42 perform the same function.

FIG. 4 is a partial exploded view, in perspective, and shows adjacent land portions of the disc and of the housing. For assembly, the two illustrated segments would be moved towards each other.

FIG. 5 illustrates schematically the approximate shear liquid flow pattern which would occur in a fluid coupling of the type illustrated at FIg. 1, but not provided with the pumping grooves. Most of the shear liquid would pass radially outwardly past the left face of driving disc., i.e., out through the region denoted by the numeral 27. A portion of the shear liquid would flow radially outwardly between the interdigitated lands and grooves in the right face of the drive disc. Both of these flows would meet at the radially outermost portion of the disc and would then be forced by dam element 26 into passage 24 for return to the reservoir 22. The relative amounts of these flows to the left and right faces of disc 14 are represented by the length of the arrows at FIG. 5. The relatively small amount of flow radially outwardly at the land and groove elements can often result in near stagnant shear liquid zones at the right-hand interface. Such stagnant zones result in undesirably high temperatures with consequent degradation and shorter life of the shear liquid.

Referring now to FIG. 6 of the drawings, the vectors $Q_{27}$ and $Q_{29}$ represent a new flow rate obtained by the practice of this invention. It will be seen that the action of secant grooves 30 and 32 is such to significantly increase the flow rate along the right face of the drive disc in relation to the flow rate along the left face. As previously, of course, the total flow $Q_{total}$ is the same and is simply the sum of the two flows along the two faces of the drive disc. The reader will note that the action of secant grooves 30 and 32 in increasing the liquid shear flow on the right face also promotes the transfer of heat by condition through the housing wall 12 to ambient.

It should be noted that if one merely changes the direction of rotation, and not the angle of the secant grooves 30 and 32, then $Q_{27}$ may be increased and $Q_{29}$ further decreased. This is not, in practice, desirable but does represent how a rotatational change affects the flow. If the rotation is maintained constant, and the secant groove angles reversed, the same effect upon the flow rate may be obtained, i.e., an increase in $Q_{27}$ and a decrease in $Q_{29}$. It will be obvious to the reader that the flow rates may be increased or decreased at will to promote optimal transfer of heat from the shear liquid to the cover or housing portions 12. The principle may be applied to any interdigitated land/ridge construction. Thus, the secant grooves of the invention may be applied to either face or to both faces of the drive disc. The direction of rotation, the depth, the angle, and the width of the grooves, for example, may be varied either singly or in combination to yield any desired flow behavior along the two faces of the disc.

As indicated at FIG. 2, the grooves 30 and 32 are aligned with each other, i.e., their respective axes lie on the same secant. Such alignment is for ease in manufacturing, but the reader will note that the same pumping action will obtain if the grooves in lands 20 which together define groove 30 are angularly staggered with respect to each other. The same is true of course of the individual grooves in lands 16 which together define grooves 32. Further it is not essential that the grooves 30 and 32 be canted in the opposite directions, as illustrated. It is necessary that their cants be different. It will further be noted that the pumping grooves may be radially disposed instead of secented and yet yield a pumping action if their ends are provided with canted liquid scooping vanes.

What is claimed is;

1. A fluid coupling of the type adapted for use to drive a fan for the radiator of an internal combustion engine, said coupling including relatively rotatable disc and housing members, said disc and housing having a common axis of rotation, said disc positioned within said housing, said disc on at least one face having a plurality of concentric lands which are positioned within mating concentric channels defined by concentric lands in said housing to thereby define interdigitated lands, said coupling adapted to contain a shear fluid to fill at least a portion of the clearance space between said lands and their corresponding channels for the purpose of transmitting torque, the improvement comprising, a pumping groove in the disc lands and a pumping groove in the housing lands, at least one of said pumping grooves being canted to thereby define a secant pumping groove.

2. The fluid coupling of claim 1 wherein the housing pumping groove and the disc pumping groove are oppositely canted with respect to each other.

3. The fluid coupling of claim 1 wherein the disc pumping groove is defined by aligned grooves in the disc lands.

4. The fluid coupling of claim 1 wherein the disc pumping groove is defined by non-aligned grooves on the disc lands.

5. The fluid coupling of claim 1 wherein the housing groove is defined by aligned grooves on the housing lands.

6. The fluid coupling of claim 1 wherein the housing pumping groove is defined by non-aligned grooves on the housing lands.

7. The fluid coupling of claim 1 wherein the housing pumping groove makes an angle with respect to the disc pumping groove.

* * * * *